Oct. 1, 1940.   S. A. DAVIS   2,216,642
SPEED CHANGER
Filed July 25, 1938   3 Sheets-Sheet 1
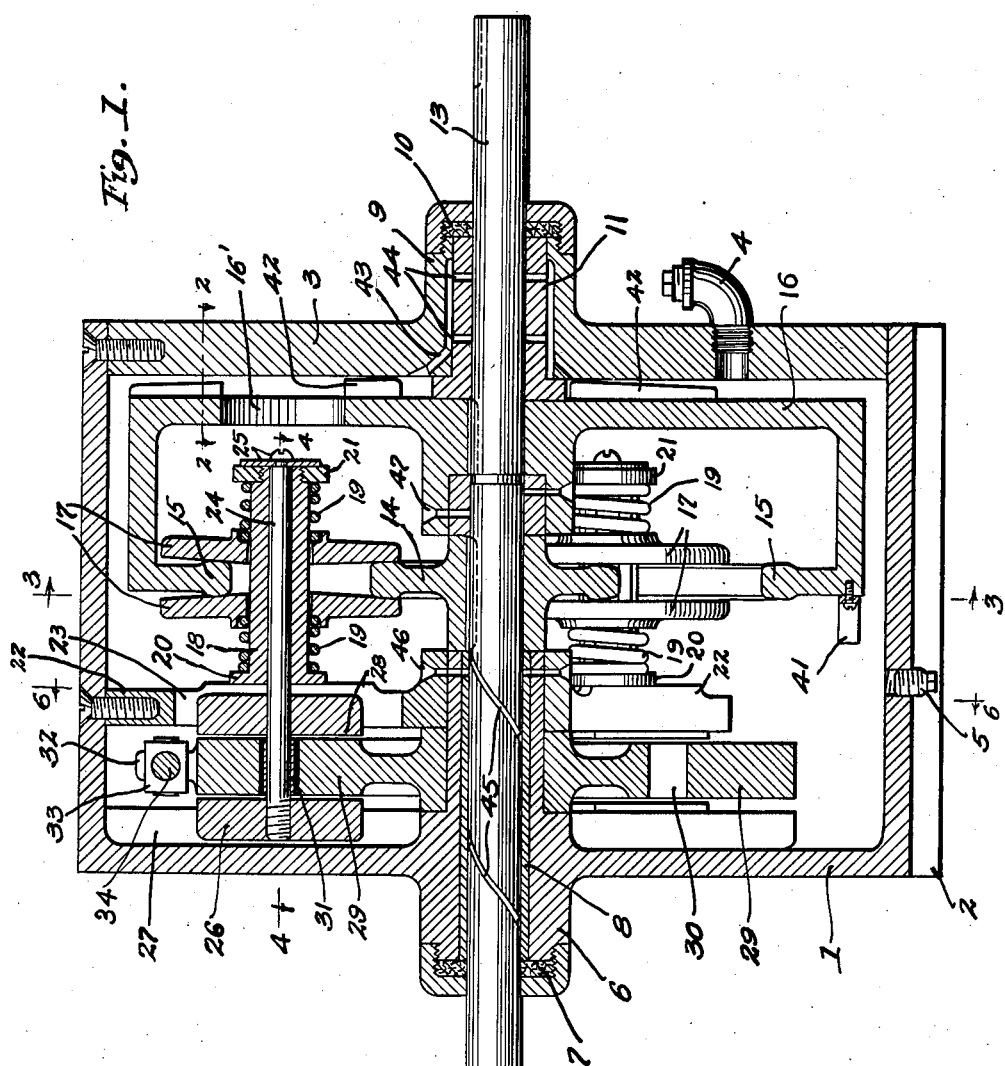
Samuel A. Davis
INVENTOR.
BY *J. Buston Suecker*
his ATTORNEY.

Oct. 1, 1940.  S. A. DAVIS  2,216,642
SPEED CHANGER
Filed July 25, 1938  3 Sheets-Sheet 2
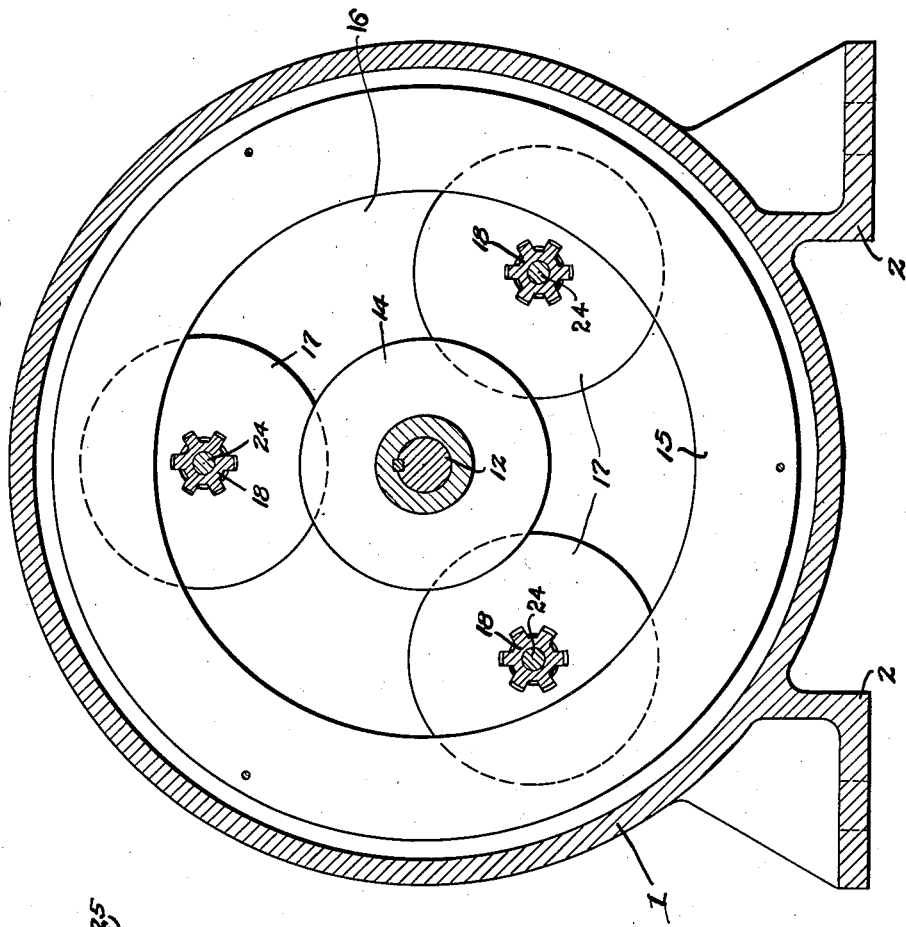
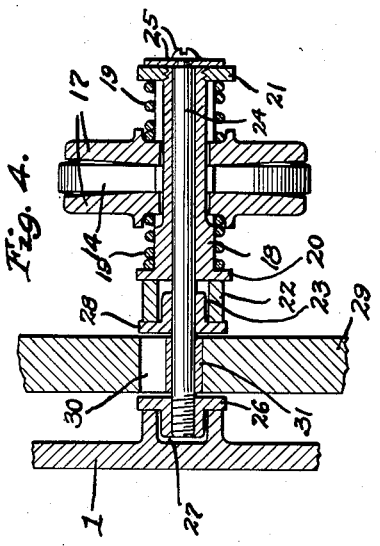
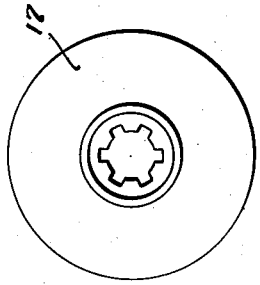
Samuel A. Davis
INVENTOR.
BY J. Preston Swecker
ATTORNEY.

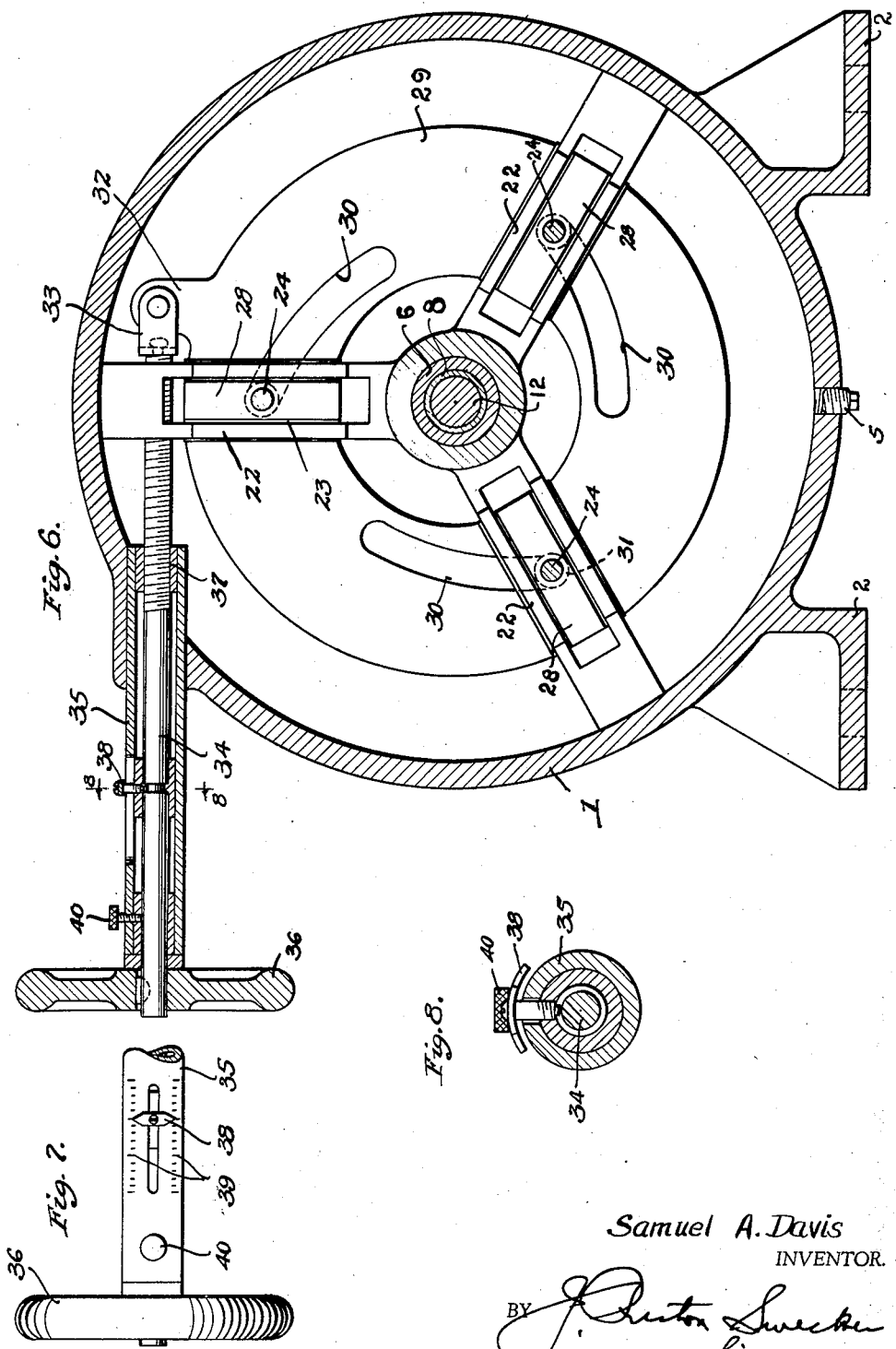

Patented Oct. 1, 1940

2,216,642

UNITED STATES PATENT OFFICE 2,216,642

SPEED CHANGER

Samuel A. Davis, Acme, Tex.

Application July 25, 1938, Serial No. 221,196

12 Claims. (Cl. 74—199)

This invention relates to an improvement in speed changers capable of being used alternately, either as a speed reducer or as a speed increaser.

The object of this invention is to improve a speed changer to provide compactness, complete lubrication, a friction gear drive capable of ready adjustment to vary the speed where desired, and which is nevertheless sufficiently positive for practical operation. It has the further advantage of longitudinal alignment of the input and output shafts, with all moving parts enclosed and running in a bath of oil. This is particularly desirable for use on machine tools or in industrial plants.

Provision is made for a transmission of power at variable speeds in a simple and effective manner. However, the invention may be used for constant speed drive, in which event the variable speed mechanism may be omitted, or set. This is particularly desirable for wind-driven pump jacks and wherever speed changing is desirable.

In carrying out this object, I have illustrated a preferred embodiment of this invention in the accompanying drawings, in which:

Fig. 1 is a longitudinal sectional view through my improved speed changer;

Fig. 2 is a detail transverse sectional view on the line 2—2 of Fig. 1;

Fig. 3 is a vertical cross section on the line 3—3 of Fig. 1;

Fig. 4 is a partial longitudinal sectional view substantially on the line 4—4 of Fig. 1;

Fig. 5 is a side elevation of the change speed disc;

Fig. 6 is a vertical cross section through the speed change mechanism, substantially on the line 6—6 of Fig. 1;

Fig. 7 is a partial plan view of the change speed adjuster; and

Fig. 8 is an enlarged transverse sectional view therethrough on the line 8—8 of Fig. 6.

The speed changer illustrated in the drawings comprises a housing 1 supported on feet or a pedestal 2, as shown in Fig. 3, and the housing 1 has one end closed by a head 3 secured to the housing to enclose a chamber that may be filled with lubricant in which the operating parts of the speed changer move for complete lubrication thereof. A filling plug 4 is shown in Fig. 1 as connected with the head 3, while a drain plug 5 is shown in Fig. 3 for the purpose of draining out the lubricant when desired.

At one side of the housing 1 is provided a hub 6 closed by a stuffing box 7 at the outer end thereof, while a bearing 8 extends inwardly through the hub to a point in the housing 1. At the opposite side of the housing, the head 3 has a hub 9 thereon provided with a stuffing box 10 and a bearing 11 supported in the hub. Journaled in the bearings 8 and 11 of the hubs 6 and 9 respectively are longitudinally aligned shafts 12 and 13, the inner ends of which are disconnected from each other and are capable of relative rotation.

Keyed on the inner end of the shaft 12 is a friction disc 14, and in radial alignment with the periphery of the disc 14 is a power friction ring 15 adapted for internal driving action, being supported by a disc wheel 16 keyed on the inner end of the shaft 13 for rotation therewith.

Interposed between the disc 14 and ring 15 is a plurality of pairs of intermediate friction discs 17, three pairs of which are shown in Fig. 3, although any desired number of intermediate discs may be provided which will provide a sufficient driving connection between the friction disc 14 and ring 15. The driving face of each friction disc 17 is shown as slightly conical and coacting with a slightly conical and semi-rounded side face on each of the disc 14 and ring 15 so as to provide substantially a line or relatively small surface therewith as distinguished from an appreciable surface contact in order to reduce friction to a minimum, and yet maintain a sufficient driving connection therewith. Each pair of friction discs 17 embrace the adjacent portions of disc 14 and ring 15 with a frictional contact therewith. These intermediate discs 17 are loosely and slidably splined upon a sleeve 18, capable of slight rocking movement relative thereto due to such looseness and also being slidable therealong under the influence of coiled springs 19 which bear against the outer faces of the discs 17, and being interposed between said discs and a head 20 and nut 21 on the sleeve 18.

Rigidly mounted within the housing 1 and extending transversely thereof is a spider 22 having a series of radial slots 23 therein, one for each pair of intermediate friction discs 17 and against the opposite sides of which the head 20 of sleeve 18 bears. Extending through the sleeve 18 is a rod 24 which also extends through a corresponding slot 23, being secured to the sleeve at one end thereof by means of a cap screw and washer 25. The opposite end of the rod 24 is screw-threaded into a T-shaped guide 26 received in a radial groove 27 in one side of the housing 1, while a similarly formed T-shaped guide 28 passes therethrough. One such unit is provided for each pair of intermediate friction discs 17.

Mounted on the inwardly projecting portion of the hub 6 and free for rotation relative thereto is an adjusting disc 29 provided with a series of arcuate or slightly spiral slots 30 therein, one for each rod 24 and through which said rod extends with a roller 31 between the rod and the sides of its slot, as shown in Fig. 1 and also in Fig. 6.

The adjusting disc 29 is provided on its periphery with an arm 32 to which is pivoted a yoke 33 having a screw shaft 34 connected with said yoke and extending laterally through the housing 1, as shown in Fig. 6. The shaft 34 extends through a guide sleeve 35 mounted in a side of the housing which carries a hand wheel 36 on its outer end portion for rotating the shaft. The shaft 34 has threaded connection at 37 with the sleeve 35 so that turning movement of the shaft will cause longitudinal movement of said shaft to rotate the adjusting disc 29 about its journal on the inwardly projecting portion of the hub 6. A pointer 38 is carried by the shaft 34 within the sleeve 35, but mounted externally of the sleeve 35 and coacts with graduations 39 on the sleeve 35 for indicating the extent of adjustment of the disc 29 and the intermediate friction discs 17 thereby. The sleeve 35 may be provided also with a locking screw 40 for holding the shaft 34 in a desired set position.

As mentioned above, the parts of the speed changer are designed to operate in a bath of lubricant as provided by the enclosed housing 1 and to provide for the distribution of oil or other lubricant over the moving parts, oil dippers 41 are provided at intervals around ring 15 and also on the outer side of the disc wheel 16 as indicated at 42, which dippers 42 are in the shape of ribs as shown in Fig. 2 and extend radially along the face of the disc wheel 16 to carry the oil to the upper portions thereof and permit it to drain downward into an oil passageway 43 leading to openings 44 in the bearings 11 as shown in Fig. 1, for lubricating the shaft 13 in said passageway 46 leading thereto, while a corresponding oil passageway 47 lubricates the shaft 12 on the opposite side of the disc 14.

In the operation of the speed changer, either the shafts 12 or 13 may be used as a driving shaft, according to whether or not an increase or decrease of speed is desired, the shaft 12 being used as a speed reducer, while the shaft 13 is used as the driving shaft when an increase in speed is desired. The rotary movement is transmitted by the shafts 12 and 13 through the friction disc 14, intermediate discs 17, and friction ring 15, as will be evident. The relative positions between the intermediate discs 17 and the disc 14 and ring 15 respectively determine the ratio of drive therebetween.

All of the groups of intermediate discs 17 are adjusted simultaneously by rotation of adjusting disc 29 about its central journal by the threaded screw 34 upon turning the hand wheel 36. Such a turning of an adjusting disc 29 in a counter-clockwise direction for instance in Fig. 6 due to the spiral shape of the slots 30, will cause inward sliding movement of the T-shaped guides 26 and 28 in the grooves 27 and slots 23 respectively which will act to cause inward adjustment of the intermediate disc assemblies simultaneously according to the adjustment of the screw shaft 34, which will move the disc 17 inwardly relative to the friction disc 14 and ring 15 changing the points of contact therewith with a consequent change in the relative driving speeds therebetween. The sleeves 18 slide in or out as desired and rotate with the intermediate discs 17, causing corresponding rotation of the springs 19 so as not to produce any wearing action on the springs.

In this way a simple and effective variable speed changer is provided which is particularly desirable for use on machine tools and in industrial plants. It is compact, self lubricating, and has the further advantage of longitudinal alignment of the shafts.

When the unit is desired for use at constant speed, the adjusting mechanism may be omitted or set, or this mechanism may be varied in structure to accomplish the desired adjustment if other forms of adjusting mechanism should be preferred.

In order to facilitate the assembling of the unit, hole 16' is disposed in disc 16, which is in alignment with shaft 24. This will make possible the necessary tightening of the nuts 21 and screws 25.

While the invention has been shown as utilizing plain bearings, it is to be understood, that anti-friction bearings may be substituted for the plain bearings, if so desired.

It is to be understood that this device may be built integral with a machine and form a part thereof, if it is desired. That is, if it is desired that the speed of an electric motor be reduced, the housing 1 of the unit may become part of the motor housing and the shaft 12 may become the motor shaft. This will give a speed reduction with the drive shaft in alignment with the motor shaft, which is very desirable in a number of drives.

I claim:

1. A speed changer comprising a housing having driving and driven shafts journaled therein, and gearing connecting said shafts together, said gearing comprising a friction disc mounted on one of said shafts, a disc wheel having an internal friction ring and connected with the other shaft, and a plurality of sets of intermediate discs interposed between the friction disc and ring, each set of intermediate discs including a pair of discs embracing adjacent portions of the friction disc and ring, means for mounting said intermediate discs for turning movement, a spider mounted in the housing and having radially extending slots therein, guides slidably mounted in said slots and carrying said mounting means, and means for adjusting said guides radially.

2. A speed changer comprising a housing having driving and driven shafts journaled therein, and gearing connecting said shafts together, said gearing comprising radially spaced friction rings, and an intermediate friction disc interposed between said friction rings and laterally overlapping the same with driving connection therewith, means mounting said intermediate disc for adjustment bodily radially relative to the friction rings, and means connected with the intermediate friction disc and movable transversely of the direction of radial adjustment thereof for causing said radial adjustment.

3. A speed changer comprising a housing having driving and driven shafts journaled therein, and gearing connecting said shafts together, said gearing comprising a friction disc mounted on one of said shafts, a disc wheel having an internal friction ring and connected with the other shaft, and a pair of intermediate discs embracing adjacent portions of the friction disc and ring and having friction driving connections therewith, means mounting said pair of intermediate discs for adjustment bodily radially in a straight line relative to the friction disc and ring, and means connected with the intermediate friction discs and movable transversely of the direction of radial adjustment thereof for causing said radial adjustment.

4. A speed changer comprising a housing having driving and driven shafts journaled therein, and gearing connecting said shafts together, said gearing comprising a friction disc mounted on one of said shafts, a disc wheel having an internal friction ring and connected with the other shaft, and a pair of intermediate discs embracing adjacent portions of the friction disc and ring and having friction driving connections therewith, a support for said intermediate discs having said discs slidably mounted thereon for individual bodily movement, resilient means bearing against the respective outer sides of the discs, and means for moving said support to adjust the position of the discs relative to the friction disc and ring.

5. A speed changer comprising a housing having driving and driven shafts journaled therein, and gearing connecting said shafts together, said gearing comprising a friction disc mounted on one of said shafts, a disc wheel having an internal friction ring and connected with the other shaft, and a pair of intermediate discs embracing adjacent portions of the friction disc and ring and having frriction driving connections therewith, a support receiving said pair of intermediate discs and having splined connection therewith, said support having abutments spaced laterally from the discs, resilient means interposed between the discs and abutments respectively, and means for adjusting said support radially relative to the friction disc and ring.

6. A speed changer comprising a housing having driving and driven shafts journaled therein, and gearing connecting said shafts together, said gearing comprising a friction disc mounted on one of said shafts, a disc wheel having an internal friction ring and connected with the other shaft, and a pair of intermediate discs embracing adjacent portions of the friction disc and ring and having friction driving connections therewith, a support receiving said pair of intermediate discs and having splined connection therewith, said support having abutments spaced laterally from the discs, resilient means interposed between the discs and abutments respectively, and means for adjusting said support radially relative to the friction disc and ring, said adjusting means including a rotatable disc having a spiral groove therein receiving said support, and means for turning said rotatable disc to adjust said discs.

7. In a speed changer, the combination of a gearing including an intermediate gear adjustable radially, a support for said gear and having a guide thereon, means receiving said guide for directing the movement thereof, an adjusting disc having a spiral groove therein receiving said support, and means for turning said adjusting disc to cause radial adjustment of the gear.

8. In a speed changer, the combination of driving and driven shafts having radially spaced friction rings connected therewith respectively, an intermediate friction disc interposed between said friction rings and having driving engagement therewith, a support mounting said disc for turning movement, means mounting said support for adjustment radially of the rings, and means connected with the support and movable transversely of the direction of radial adjustment thereof for causing said radial adjustment of the support.

9. In a speed changer, the combination of driving and driven shafts having radially spaced friction rings connected therewith respectively, an intermediate friction disc interposed between said friction rings and having driving engagement therewith, a support mounting said disc for turning movement, means mounting said support for adjustment radially of the rings, and means connected with the support and movable transversely at an acute angle to the direction of radial adjustment thereof for causing said radial adjustment of the support.

10. In a speed changer, the combination of driving and driven shafts having radially spaced friction rings connected therewith respectively, an intermediate friction disc interposed between said friction rings and having driving engagement therewith, a support mounting said disc for turning movement, means mounting said support for adjustment radially of the rings, and means mounted for turning movement and having a spiral slot therein receiving the support for causing radial adjustment thereof upon turning of said means.

11. In a speed changer, the combination of driving and driven shafts having radially spaced friction rings connected therewith respectively, an intermediate friction disc interposed between said friction rings and having driving engagement therewith, a support mounting said disc for turning movement, means mounting said support for adjustment radially of the rings, and a disc mounted for turning movement coaxially of the shafts and having a spiral slot therein receiving the support for causing radial adjustment thereof upon turning of said disc.

12. A speed changer comprising a housing having driving and driven shafts journaled therein, and gearing connecting said shafts together, said gearing comprising a friction disc mounted on one of said shafts, a disc wheel having an internal friction ring and connected with the other shaft, and a pair of intermediate discs embracing adjacent portions of the friction disc and ring and having friction driving connections therewith, a support receiving said pair of intermedate discs, said support having abutments spaced laterally from the discs, resilient means interposed between the discs and abutments respectively, and means for adjusting said support radially relative to the friction disc and ring.

SAMUEL A. DAVIS.